(12) United States Patent
Mizutani

(10) Patent No.: US 10,376,982 B2
(45) Date of Patent: Aug. 13, 2019

(54) HAND TOOL FOR WELDING-TORCH MAINTENANCE

(71) Applicant: SEVENTY EIGHT Co., Ltd., Osaka (JP)

(72) Inventor: Tetsuya Mizutani, Osaka (JP)

(73) Assignee: SEVENTY EIGHT CO., LTD., Osaka (JP)

( * ) Notice: Subject to any disclaimer, the term of this patent is extended or adjusted under 35 U.S.C. 154(b) by 186 days.

(21) Appl. No.: 15/252,358

(22) Filed: Aug. 31, 2016

(65) Prior Publication Data
US 2017/0182583 A1 Jun. 29, 2017

(30) Foreign Application Priority Data

Dec. 25, 2015 (JP) .................................. 2015-6571 U

(51) Int. Cl.
*B23K 9/32* (2006.01)
*B25B 7/22* (2006.01)
(Continued)

(52) U.S. Cl.
CPC ................ *B23K 9/328* (2013.01); *B25B 7/02* (2013.01); *B25B 7/08* (2013.01); *B25B 7/22* (2013.01); *B25F 1/003* (2013.01)

(58) Field of Classification Search
CPC ......... F23D 14/50; F23D 14/465; B25B 7/22; B25B 13/5083; B25B 13/5016; B25B 13/50
(Continued)

(56) References Cited

U.S. PATENT DOCUMENTS

| 86,048 A | * | 1/1869 | Wetzler | B25B 7/22 |
| | | | | 7/130 |
| 1,364,829 A | * | 1/1921 | Berg | B25F 1/006 |
| | | | | 7/130 |

(Continued)

FOREIGN PATENT DOCUMENTS

| EP | 0284896 A2 * | 10/1988 | ............... B25B 7/22 |
| JP | 5-2302 | 1/1993 | |

OTHER PUBLICATIONS

MWTCA , Mid west tool collectors association, "From 2014 Issues." M-WTCA, Dec. 2014, mwtca.org/whats-its/gristmill-whats-its/from-2014-issues/.*

(Continued)

*Primary Examiner* — Joseph J Hail
*Assistant Examiner* — Arman Milanian
(74) *Attorney, Agent, or Firm* — Renner, Otto, Boisselle & Sklar, LLP

(57) ABSTRACT

A hand tool for welding-torch maintenance, which can remove sputter adhering to a nozzle with sufficient working efficiency. The hand tool has a pair of metal stays turnably supported by a pivoting axis. The metal stays comprises grips handled by a user, 1st pinchings used for pulling a welding-wire, and 2nd pinchings used for removing sputter adhering to the nozzle. The 1st pinchings are configured so as to be inserted into the nozzle when the metal stays are closed. The 2nd pinchings have projections which are extended outside from the backs of the 1st pinchings and thrown out towards heads of the 1st pinchings. The sputter adhering to the inner-and-outer circumferential surfaces and end face of the nozzle are removed by inserting the 1st pinchings into the nozzle, inserting the end of the nozzle between the 2nd pinchings and the 1st pinchings, and (Continued)

moving the tool to scratch the sputter off the inner-and-outer circumferential surfaces and the end face of the nozzle.

3 Claims, 8 Drawing Sheets

(51) Int. Cl.
 *B25F 1/00* (2006.01)
 *B25B 7/02* (2006.01)
 *B25B 7/08* (2006.01)
(58) Field of Classification Search
 USPC .................................................. 81/418–426
 See application file for complete search history.

(56) References Cited

U.S. PATENT DOCUMENTS

| | | | | |
|---|---|---|---|---|
| 1,545,135 A * | 7/1925 | Fisher | ................. | B25B 7/02 30/226 |
| 1,902,913 A * | 3/1933 | Sievern | ................. | B23D 49/12 7/129 |
| 1,981,048 A * | 11/1934 | Keller | ................. | B25B 7/10 30/363 |
| 3,808,617 A * | 5/1974 | Lindsten | ................. | B25B 7/02 7/126 |
| 3,965,719 A * | 6/1976 | Hays | ................. | H01R 43/0421 7/134 |
| 4,219,919 A * | 9/1980 | Fischbein | ................. | A44C 5/185 29/270 |
| 4,651,554 A * | 3/1987 | Grudzinskas | ................. | H01H 9/286 7/107 |
| D307,699 S * | 5/1990 | Suganami | ................. | D8/52 |
| D386,375 S * | 11/1997 | Harris | ................. | D8/52 |
| D449,768 S * | 10/2001 | Salazar | ................. | D8/105 |
| 7,039,973 B1* | 5/2006 | Lehmann | ................. | A01K 97/00 7/106 |
| 7,676,873 B1* | 3/2010 | Simms | ................. | B25B 7/02 7/129 |
| D618,299 S * | 6/2010 | Steiner | ................. | D22/149 |
| 8,800,411 B2* | 8/2014 | Seemangal | ................. | B25B 7/02 7/107 |
| D793,195 S * | 8/2017 | Grass | ................. | D22/149 |
| 2008/0173144 A1* | 7/2008 | Hiller | ................. | B25B 7/04 81/337 |
| 2010/0288085 A1* | 11/2010 | Carter | ................. | B25B 7/02 81/302 |
| 2012/0000019 A1* | 1/2012 | Steele | ................. | B25B 7/08 7/107 |
| 2015/0101128 A1* | 4/2015 | Warner | ................. | F41B 5/148 7/125 |

OTHER PUBLICATIONS

Time Chemical Corporation, online, Dec. 4, 2015 searched, the Internet URL:http://www.timechemical.co.jp/.

\* cited by examiner

HAND TOOL FOR WELDING-TORCH MAINTENANCE

FIELD OF THE INVENTION

The present invention relates to a hand tool used to maintain a welding-torch with which welding equipment is equipped, and particularly relates to a hand tool for welding-torch maintenance used for disassembly and assembly of a welding-torch and removal of sputter adhering to the welding-torch, etc.

BACKGROUND OF THE INVENTION

In a welding-torch of an automatic-welding equipment for arc welding, the welding torch body is held on a robot arm, and parts, such as a nozzle for sending out shielding gas and a chip for sending out welding-wire, are attached to the torch body in a manner of enabling attachment and detachment. It is necessary to detach parts, such as a nozzle and a chip, from the torch body for check. Moreover, when the arc welding is performed, sputter (particulates dispersed at a time of welding) will adhere to the nozzle. The sputter adhering to the nozzle has a bad influence on sending out of the shielding gas. For this reason, it is necessary to remove the sputter adhering to the nozzle. The nozzle is detached from the torch body and removal of the sputter is performed by scratching the sputter off the nozzle. Moreover, when the arc welding is performed, a drop ball will be formed at the tip of the welding-wire. The drop ball is an obstacle at the time of detaching the chip. For this reason, when detaching the chip, it is necessary to take off the drop ball after cutting the welding-wire. Moreover, when performing the arc welding, the welding-wire may have to be pulled out from the chip in some cases.

Then, a hand tool is known in a document 1 and a document 2 (as described later), which is used in order to maintain a welding-torch, for example, to perform disassembly and assembly of the welding-torch and removal of the sputter adhering to the welding-torches. This hand tool has a pair of metal stays which are turnably supported at a pivoting axis, and the metal stays have a pair of grips located in one side of the stays in relation to the pivoting axis for a user to do turning operation of the metal stays. And a pair of 1st pinchings, which is used when pulling out the welding-wire for removing the sputter adhering to the inner-and-outer circumferential surfaces of the nozzle, is located at a head in the other side of the metal stays. Moreover, another pair of pinchings for attaching and detaching the chip and a pair of cutter blades for cutting the welding-wire are located between the 1st pinchings and the pivoting axis. Moreover, furthermore another pair of pinchings, which is used when attaching and detaching the nozzle, is located between the pivoting axis and the grips. Moreover, hammer parts for striking the nozzle are located between the 1st pinchings and the pivoting axis, and the hammer parts are also used when removing the sputter adhering to an end face of the nozzle.

When removing the sputter adhering to the inner-and-outer circumferential surfaces of the nozzle, the nozzle is pinched with the 1st pinchings so that each of the 1st pinchings may touch the inner circumferential surface and the outer circumferential surface, and the hand tool is moved so that the 1st pinchings may scratch the inner-and-outer circumferential surfaces. Thereby, the sputter adhering to the inner-and-outer circumferential surfaces of the nozzle is scratched off and removed. Moreover, when removing the sputter adhering to the end face of the nozzle, the 1st pinchings are inserted into the nozzle in a state where the pair of metal stays are closed, the hammer parts are made to touch the end face of the nozzle, and the hand tool is moved so that the hammer parts may scratch the end face of the nozzle. Thereby, the sputter adhering to the end face of the nozzle is scratched off and removed.

Document 1: Japanese examined utility model application publication No. H5-2302

Document 2: TIME CHEMICAL Corporation, online, Dec. 4, 2015 searched, the Internet <URL:http://www.ti-mechemical.co.jp/>

DISCLOSURE OF THE INVENTION

However, in the usage of the conventional hand tool mentioned above, there is a difference between when removing the sputter adhering to the inner-and-outer circumferential surfaces of the nozzle and when removing the sputter adhering to the end face of the nozzle. Consequently, each of the work for removing the sputter adhering to the inner-and-outer circumferential surfaces of the nozzle and the work for removing the sputter adhering to the end face of the nozzle falls into a different work processes, and the working efficiency in removing the sputter adhering to the nozzle is no good.

Accordingly, it is an object of the present invention to provide a hand tool for welding-torch maintenance which can remove sputter adhering to a nozzle with sufficient working efficiency.

In order to achieve the object, the hand tool for welding-torch maintenance having a pair of metal stays crossing at a pivoting axis and turnably supported by the axis, wherein the pair of metal stays comprises: grips located in one side of the stays, which are handled by a user for turning the metal stays; 1st pinchings located at a head in the other side of the metal stays, which are used for pinching a welding-wire when the welding-wire is pulled out; and 2nd pinchings located at a back of the 1st pinchings for pinching a nozzle of the welding-torch and touching inner-and-outer circumferential surfaces of the nozzle to remove sputter adhering to the surfaces; wherein the 1st pinchings are configured so as to be inserted into the nozzle when the metal stays are closed by turning, and the 2nd pinchings have projections and concave spaces, wherein the projections are extended outside from the back of the 1st pinchings and thrown out towards the head of the 1st pinchings, and the concave spaces each have mutually facing planes configured by an inside plane of the projection and the back of the 1st pinching, wherein the mutually facing planes touch the inner-and-outer circumferential surfaces around an end of the nozzle when the 1st pinching is inserted into the nozzle.

According to the present invention, the sputter adhering to the inner circumferential surface, the outer circumferential surface, and also the end face of the nozzle can be removed by inserting the 1st pinchings into the nozzle, putting the end of the nozzle between the 2nd pinchings and the 1st pinchings, and by moving the hand tool so that the inner-and-outer circumferential surfaces and the end face of the nozzle may be scratched. Therefore, it is possible to remove the sputter adhering to the inner circumferential surface, the outer circumferential surface, and also the end face of the nozzle by such work for moving the hand tool after putting the end of the nozzle between the 2nd pinchings and the 1st pinchings, and the removal of the sputter adhering to the nozzle can be done with sufficient working efficiency.

DETAILED DESCRIPTION OF THE INVENTION

Figure 1:
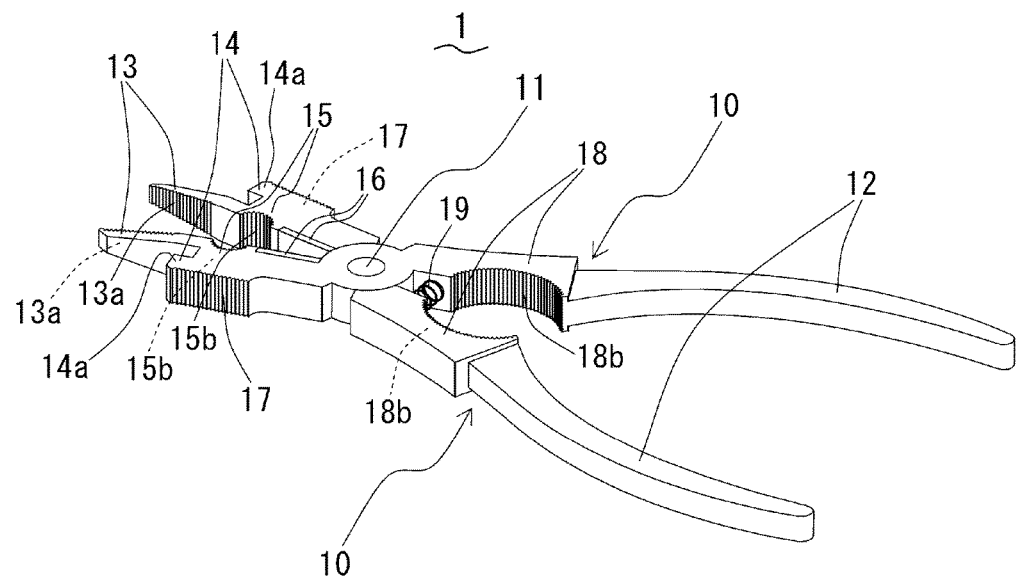
FIG. 1 is a perspective view showing a hand tool for welding-torch maintenance according to an embodiment of the present invention.
Figure 2:
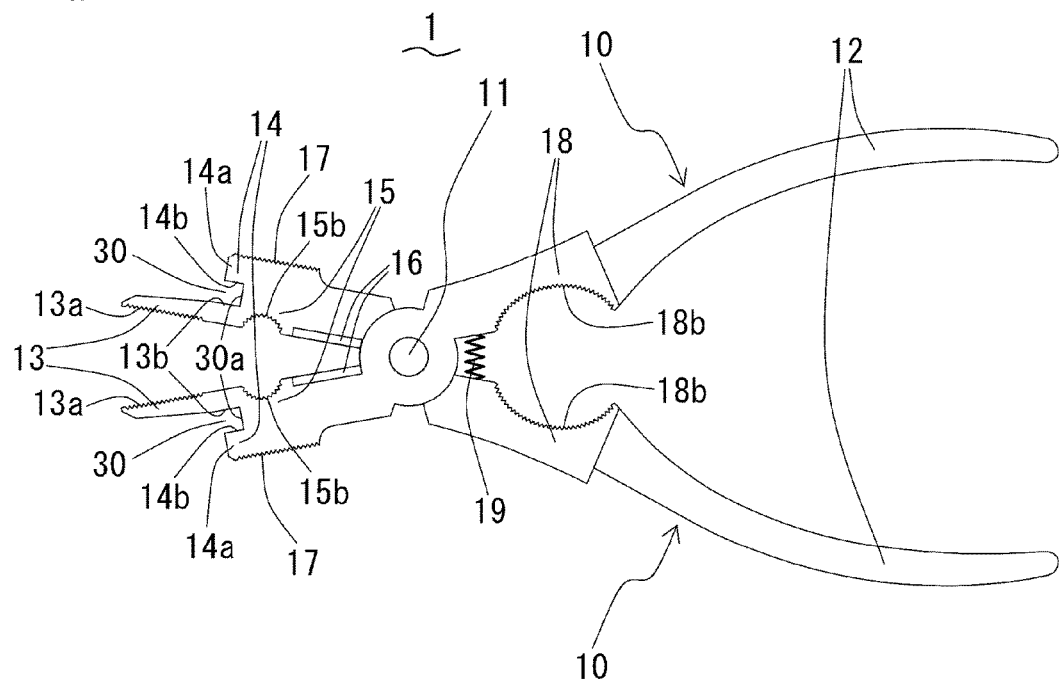
FIG. 2 is a plan view in a state where metal stays of the hand tool are opened.
Figure 3:
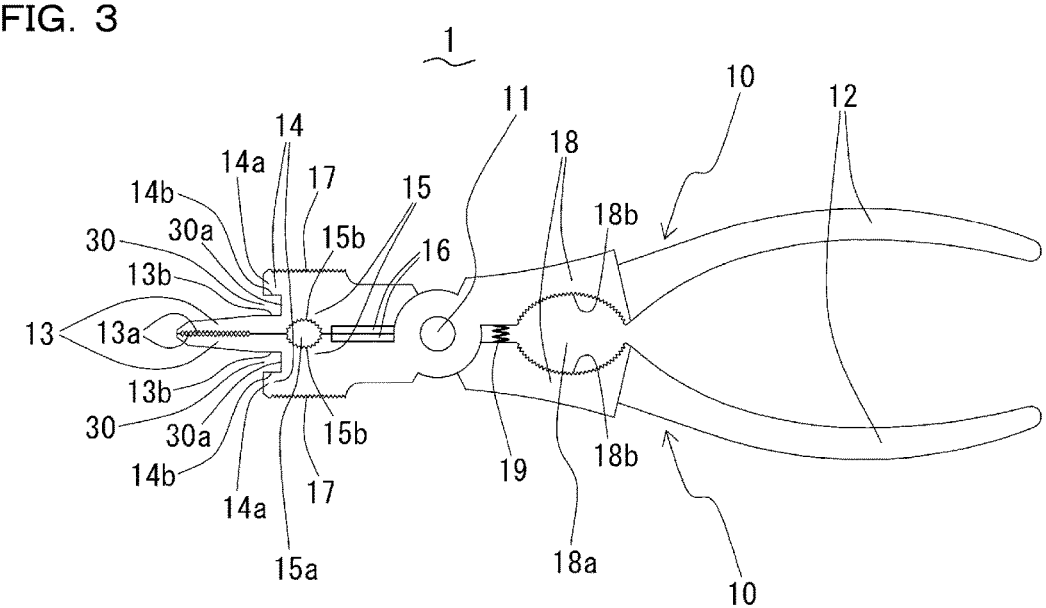
FIG. 3 is a plan view in a state where the metal stays of the hand tool are closed.
Figure 4A:
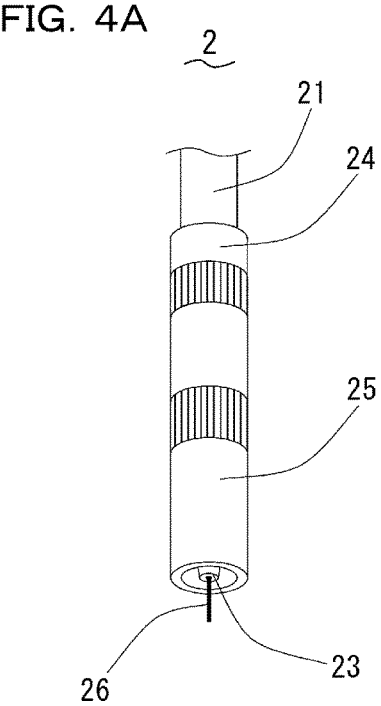
FIG. 4A is a perspective view of a welding-torch and FIG. 4B is a sectional view thereof.
Figure 4B:
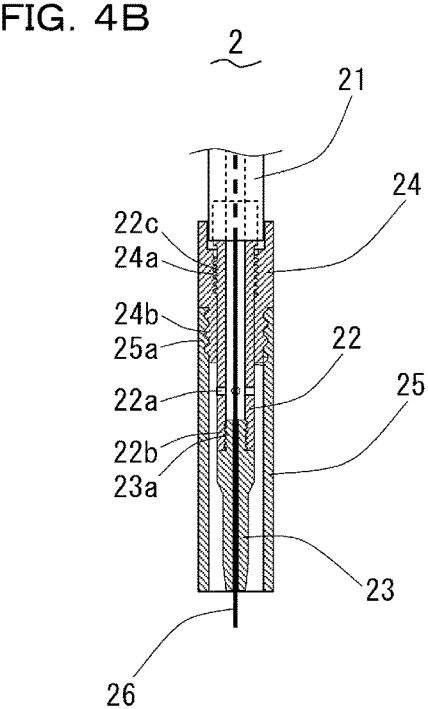
Figure 5A:
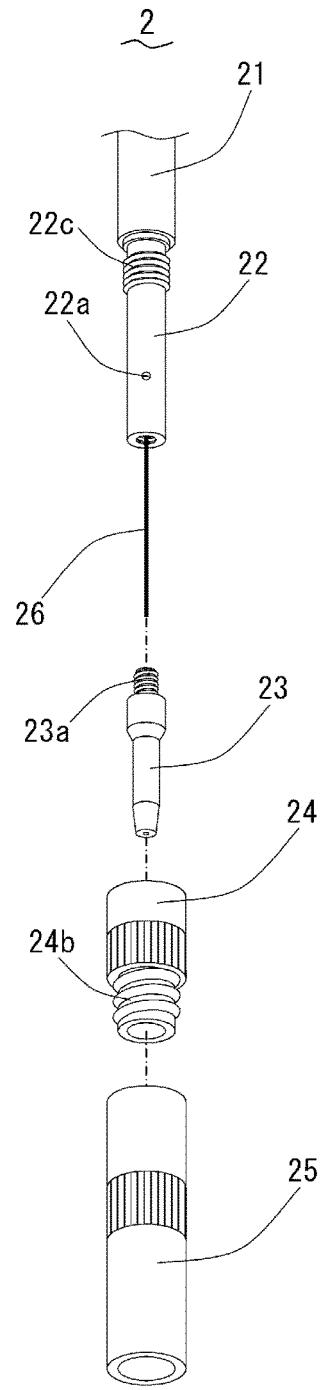
FIG. 5A is an exploded perspective view of the welding-torch.
Figure 5B:
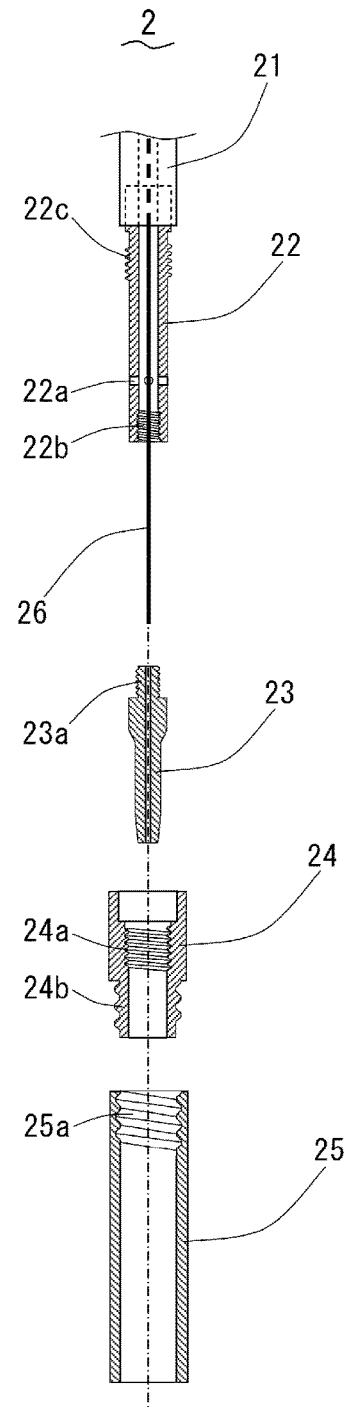
FIG. 5B is a sectional view thereof.

Hereafter, a hand tool for welding-torch maintenance according to an embodiment of the present invention is explained with reference to drawings. FIG. 1, FIG. 2, and FIG. 3 show a hand tool 1 for welding-torch maintenance, and FIG. 4A, FIG. 4B, FIG. 5A, and FIG. 5B show a welding-torch 2. The hand tool 1 is a hand tool used in order to maintain the welding-torch 2, and is a hand tool used for disassembly and assembly of the welding-torch 2 and removal of sputter adhering to the welding-torch 2, etc.

Here, the welding-torch 2 is explained with reference to FIG. 4 and FIG. 5. The welding-torch 2 is attached to automatic-welding equipment for arc welding, and comprises: a torch body 21 held on a robot arm of the automatic-welding equipment (not shown); a chip body 22 attached to the torch body 21; a chip 23 and an insulator (insulating pipe) 24 which are attached to the chip body 22 detachably and attachably; and a nozzle 25 attached to the insulator 24 detachably and attachably.

Each of the torch body 21 and the chip body 22 has an empty space inside, and the inside of the torch body 21 communicates with that of the chip body 22. Holes 22a are formed in the side surface of the chip body 22, which communicate with the inside of the chip body 22. The chip 23 has an empty space inside and openings at both ends, and is attached to the chip body 22 so that the inside of the chip 23 may communicate with that of the chip body 22. The chip 23 is fixed to the chip body 22 by screwing together using male screw part 23a of the chip 23 and female screw part 22b of the chip body 22. The insulator 24 has a shape of a pipe with an empty space inside and openings at both ends, and is attached to the chip body 22 so that a part of the chip body 22 may be contained inside the insulator 24. The insulator 24 is fixed to the chip body 22 by screwing together using female screw part 24a of the insulator 24 and male screw part 22c of the chip body 22. The nozzle 25 has a shape of a pipe with an empty space inside and openings at both ends, and is attached to the insulator 24 so that a part of the chip body 22 may be contained inside the nozzle 25. The nozzle 25 is fixed to the insulator 24 by screwing together using female screw part 25a of the nozzle 25 and male screw part 24b of the insulator 24.

The torch body 21 is connected with a welding-wire feed section (not shown) of the automatic-welding equipment, and a welding-wire 26 is sent out from the welding-wire feed section. The welding-wire 26 passes through each inside of the torch body 21, the chip body 22, and the chip 23, and is drawn from an end (it is also an end of the nozzle 25) of the chip 23. Moreover, the torch body 21 is connected with a shielding gas feed section (not shown) of the automatic-welding equipment, and shielding gas is supplied from the shielding gas feed section. The shielding gas passes through each inside of the torch body 21 and the chip body 22, blows off from the holes 22a of the chip body 22, passes through the inside of the nozzle 25, and is sent out from the end of the nozzle 25.

Next, the hand tool 1 is explained with reference to FIG. 1, FIG. 2 and FIG. 3. The hand tool 1 comprises a pair of metal stays 10, and a pivoting axis 11 which supports the metal stays 10 turnably. Metal stays 10 cross mutually at the position of the pivoting axis 11. That is, the pair of metal stays 10 of the hand tool 1 intersect in shape of X character around the pivoting axis 11 and supported turnably by the pivoting axis 11. The pair of metal stays 10 comprises: a pair of grips 12, which is handled by a user for turning the metal stays 10; a pair of 1st pinchings 13 used when pulling out the welding-wire 26 from the chip 23 of the welding-torch 2; and a pair of 2nd pinchings 14 used when removing the sputter adhering to the nozzle 25 of the welding-torch 2. Moreover, the pair of metal stays 10 further comprises: a pair of 3rd pinchings 15 used when the chip 23 of the welding-torch 2 is attached and detached; a pair of cutter blades 16 for cutting the welding-wire 26; a pair of file-down portions 17 for grinding used when removing the sputter adhering to the nozzle 25 of the welding-torch 2; and a pair of 4th pinchings 18 used when attaching and detaching the nozzle 25 and the insulator 24 of the welding-torch 2.

Here, names of one side and other side are given to both sides of the metal stays 10, in other words, the pivoting axis 11 is between the one side and the other side, which are divided and defined by the crossing point of the stays 10 at the pivoting axis 11. The grips 12 are located in the one side of the metal stays 10. The 1st pinchings 13 are located in the other side of the metal stays 10 and at heads of the metal stays 10. The 2nd pinchings 14 are located in the other side of the metal stays 10 and at backs of the 1st pinchings 13. The 3rd pinchings 15 are located in the other side of the metal stays 10 and between the 1st pinchings 13 and the pivoting axis 11. The cutter blades 16 are located in the other side of the metal stays 10 and between the 3rd pinchings 15 and the pivoting axis 11. The file-down portions 17 are located in the other side of the metal stays 10 and outside the 3rd pinchings 15. The 4th pinchings 18 are located in the one side of the metal stays 10 and between the pivoting axis 11 and the grips 12.

Moreover, the hand tool 1 is equipped with a spring 19 for keeping the pair of metal stays 10 open. The spring 19 intervenes between the pair of metal stays 10 at a position between the pivoting axis 11 and the 4th pinchings 18 in a state where the spring 19 is compressed. In a natural state where the user does not grasp the grips 12, the pair of metal stays 10 are kept open by the power of the spring 19 (refer to FIG. 2). When the user grasps the grips 12, the pair of metal stays 10 undergo turning operation, and the pair of metal stays 10 turn on the pivoting axis 11 against the power of the spring 19, and are closed (refer to FIG. 3). In a state where the pair of metal stays 10 are closed, the edge of the cutter blade 16 of one of the metal stays 10 and that of the cutter blade 16 of the other one of the metal stays 10 becomes in a state where they touch mutually.

The 1st pinchings 13 have a pair of planes 13a, which are parallel and facing mutually when the pair of metal stays 10 are closed. When pulling out the welding-wire 26, the 1st pinchings 13 are used so as to pinch the welding-wire 26 with the planes 13a. Knurled pattern (fine unevenness pattern) is formed on each of the planes 13a for preventing a slide between the 1st pinchings 13 and the welding-wire 26. The knurled patterns formed on the 1st pinchings 13 consist of a lot of grooves parallel to the pivoting axis 11. The 1st pinchings 13 are configured so as to be inserted into the nozzle 25 when the pair of metal stays 10 are closed, and they have shapes lengthened straightly and slenderly and becoming thinner nearer the heads. Moreover, the 1st pinchings 13 are used also when removing the sputter adhering to the inner-and-outer circumferential surfaces of the nozzle 25 by pinching the nozzle 25 so that each of the planes 13a or their edges may touch the inner circumferential surface and the outer circumferential surface, respectively.

The 2nd pinchings 14 each have a projection 14a and a concave space 30. The projections 14a are extended outside from the backs 13b of the 1st pinchings 13 and thrown out towards the heads of the 1st pinchings 13 (refer to FIG. 2 and FIG. 3). The concave spaces 30 each have mutually facing planes, that is, the plane 13b configured by the back of the 1st pinching 13 and the plane 14b configured by an inside plane of the projection 14a. The facing planes 13b, 14b are configured so as to touch the inner-and-outer circumferential surfaces around the end of the nozzle 25, and bottom surfaces 30a of the concave spaces 30 are also configured so as to touch the end face of the nozzle 25, when the 1st pinchings 13 are inserted into the nozzle 25, or when one of the 2nd pinchings 14 is inserted into the nozzle 25. The facing planes 13b, 14b and the bottom surfaces 30a are made flat. When removing the sputter adhering to the inner-and-outer circumferential surfaces and the end face of the nozzle 25, the 2nd pinchings 14 are used so that the facing planes 13b, 14b or their edges may touch the inner-and-outer circumferential surfaces of the nozzle 25 and the bottom surface(s) 30a or its edge (their edges) may touch the end face of the nozzle 25, by inserting one of them into the nozzle 25 or by pinching the nozzle 25 with them.

The 3rd pinchings are configured so as to form a cylindrical space 15a (refer to FIG. 3) in view from the direction of the pivoting axis 11 when the metal stays 10 are closed. That is, the 3rd pinchings 15 have a pair of curved surfaces 15b which form the cylindrical space 15a. The 3rd pinchings 15 are used, when attaching and detaching the chip 23, so as to pinch the chip 23 with the curved surfaces 15b. Knurled pattern is formed on each of the curved surfaces 15b, for preventing a slide between the 3rd pinchings 15 and the chip 23. The knurled patterns formed on the 3rd pinchings 15 consist of a lot of grooves parallel to the pivoting axis 11.

The file-down portions 17 for grinding are formed on outside surfaces of the projections 14a, and knurled patterns for filing down the sputter adhering to the nozzle 25 are formed thereon. The knurled patterns formed on the file-down portions 17 consist of a lot of grooves parallel to the pivoting axis 11, for example. The file-down portions 17 are used, when removing the sputter adhering to the outer circumferential surface and end face of the nozzle 25, so as to scrape or scratch the outer circumferential surface and end face of the nozzle 25.

The 4th pinchings 18 are configured so as to form a cylindrical space 18a (refer to FIG. 3) in view from the direction of the pivoting axis 11 when the metal stays 10 are closed. That is, the 4th pinchings 18 have a pair of curved surfaces 18b which form the cylindrical space 18a. The 4th pinchings 18 are used, when attaching and detaching the nozzle 25 and the insulator 24 of the welding-torch 2, so as to pinch the nozzle 25 and the insulator 24 with the curved surfaces 18b. Knurled pattern is formed on each of the curved surfaces 18b, for preventing a slide between the 4th pinchings 18 and the nozzle 25, and between the 4th pinchings 18 and the insulator 24. The knurled patterns formed on the 4th pinchings 18 consist of a lot of grooves parallel to the pivoting axis 11.

Figure 6:
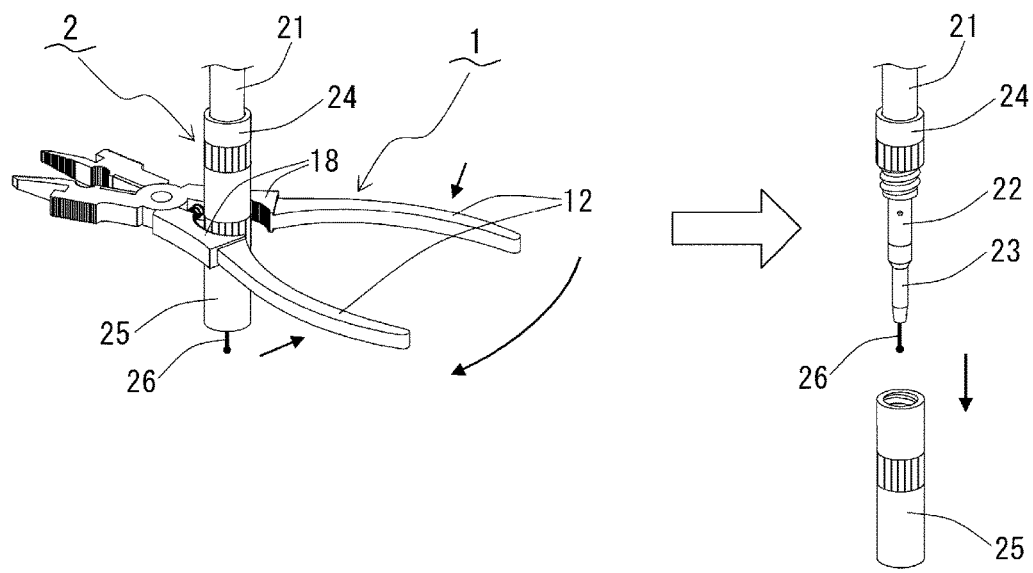
FIG. 6 is a figure explaining how to remove a nozzle of the welding-torch using the hand tool.

Next, usage of the hand tool 1 is explained with reference to FIG. 6 to FIG. 14. FIG. 6 shows a detaching method of the nozzle 25 of the welding-torch 2 using the hand tool 1. When detaching the nozzle 25 from the welding-torch 2, a user has the grips 12 of the hand tool 1, and puts the nozzle 25 between the 4th pinchings 18. Then, the user grasps the grips 12 tightly and turns the hand tool 1 in a direction for unscrewing the nozzle 25 and the insulator 24. The nozzle 25 turns together with the hand tool 1, and the nozzle 25 is unscrewed from the insulator 24. And the user draws out the unscrewed and released nozzle 25 from the chip body 22, the chip 23, and the welding-wire 26. Thereby, the nozzle 25 is detached from the welding-torch 2. When attaching the nozzle 25, a process in reverse order to the above-mentioned process is performed.

Figure 7:
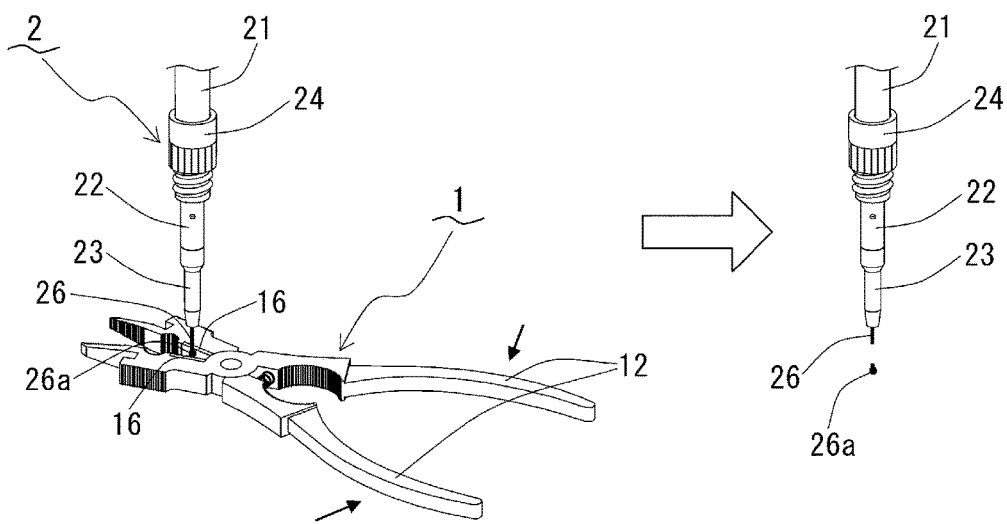
FIG. 7 is a figure explaining a cutting method of a welding-wire of the welding-torch using the hand tool.

FIG. 7 shows a cutting method of the welding-wire 26 of the welding-torch 2 using the hand tool 1. The cutting of the welding-wire 26 is performed in order to take off a drop ball 26a formed at the tip of the welding-wire 26 for example. At this time, the nozzle 25 may be attached and may be removed (removed in the example shown). When cutting the welding-wire 26, a user has the grips 12 and puts the welding-wire 26 between the cutter blades 16 of the hand tool 1. And the user grasps the grips 12 tightly. Thereby, the welding-wire 26 is cut with the cutter blades 16.

Figure 8:
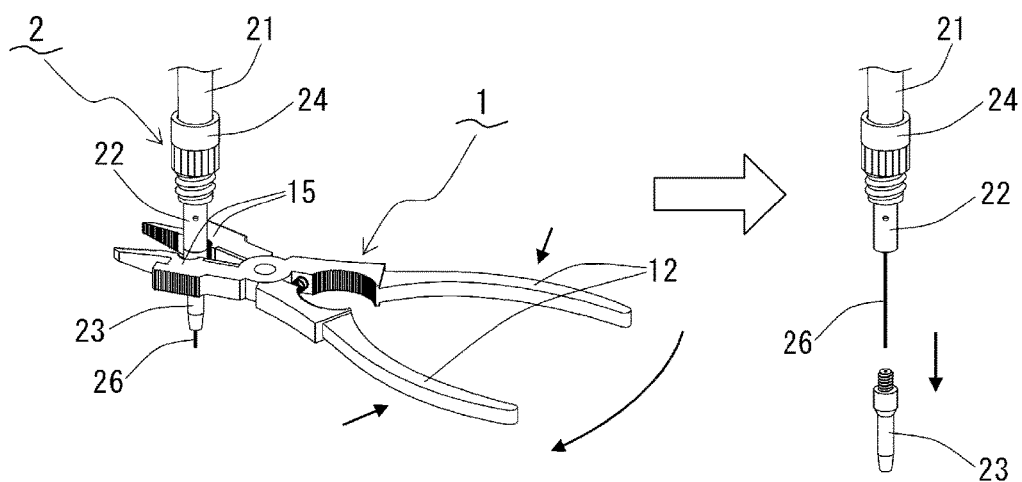
FIG. 8 is a figure explaining how to remove a chip of the welding-torch using the hand tool.

FIG. 8 shows a detaching method of the chip 23 of the welding-torch 2 using the hand tool 1. Detaching of the chip 23 is performed in a state where the nozzle 25 is removed. At this time, the insulator 24 may be attached and may be removed (attached in the example shown). When detaching the chip 23 from the welding-torch 2, a user has the grips 12 of the hand tool 1, and puts the chip 23 between the 3rd pinchings 15. Then, the user grasps the grips 12 tightly and turns the hand tool 1 in a direction for unscrewing the chip 23 and the chip body 22. The chip 23 turns together with the hand tool 1, and the chip 23 is unscrewed from the chip body 22. And the user draws out the unscrewed and released chip 23 from the welding-wire 26. Thereby, the chip 23 is detached from the welding-torch 2. When attaching the chip 23, a process in reverse order to the above-mentioned process is performed.

Figure 9:
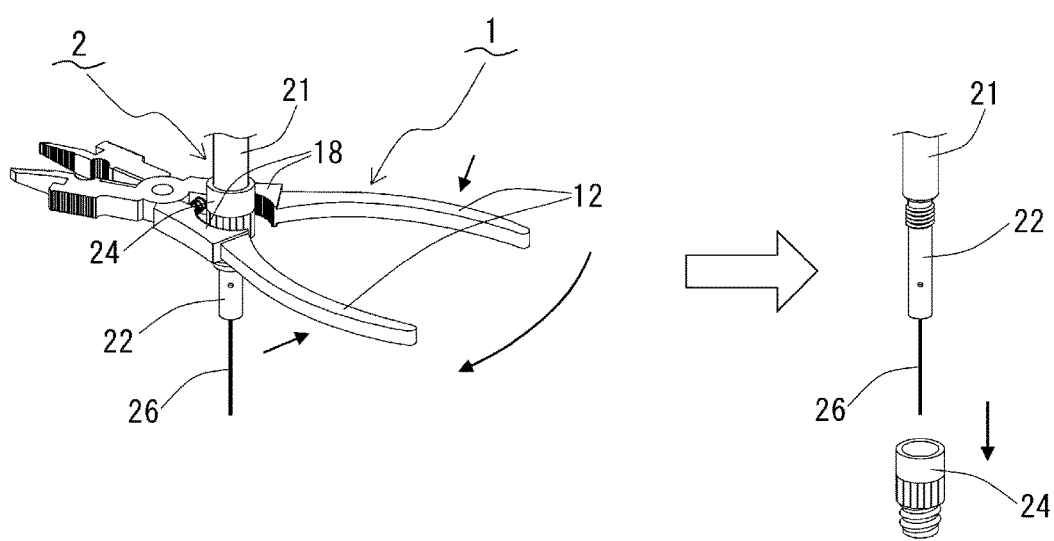
FIG. 9 is a figure explaining how to remove an insulator of the welding-torch using the hand tool.

FIG. 9 shows a detaching method of the insulator 24 of the welding-torch 2 using the hand tool 1. Detaching of the insulator 24 is performed in a state where the nozzle 25 is removed. At this time, the chip 23 may be attached and may be removed (removed in the example shown). When detaching the insulator 24 from the welding-torch 2, a user has the grips 12 of the hand tool 1, and puts the insulator 24 between the 4th pinchings 18. Then, the user grasps the grips 12 tightly and turns the hand tool 1 in a direction for unscrewing the insulator 24 and the chip body 22. The insulator 24 turns together with the hand tool 1, the insulator 24 is unscrewed from the chip body 22. And the user draws out the unscrewed insulator 24 from the chip body 22 and the welding-wire 26. Thereby, the insulator 24 is detached from the welding-torch 2. When attaching the insulator 24, a process in reverse order to the above-mentioned process is performed.

Figure 10:
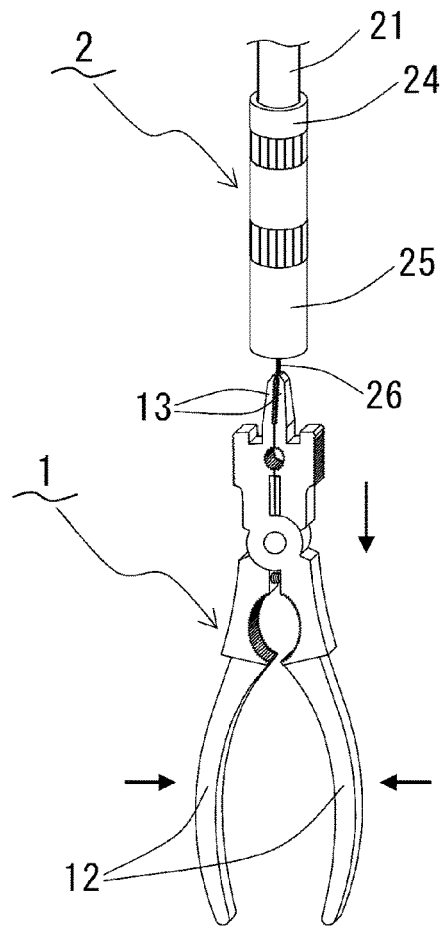
FIG. 10 is a figure explaining how to pull out the welding-wire of the welding-torch using the hand tool.

FIG. 10 shows a pulling out method of the welding-wire 26 of the welding-torch 2 using the hand tool 1. When pulling out the welding-wire 26, the nozzle 25 may be attached and may be removed (attached in the example shown). When pulling out the welding-wire 26 from the welding-torch 2, a user has the grips 12 of the hand tool 1, and puts the welding-wire 26 between the 1st pinchings 13. And the user grasps the grips 12 tightly and pulls the hand tool 1. Thereby, the welding-wire 26 is pulled out from the welding-torch 2.

Figure 11:
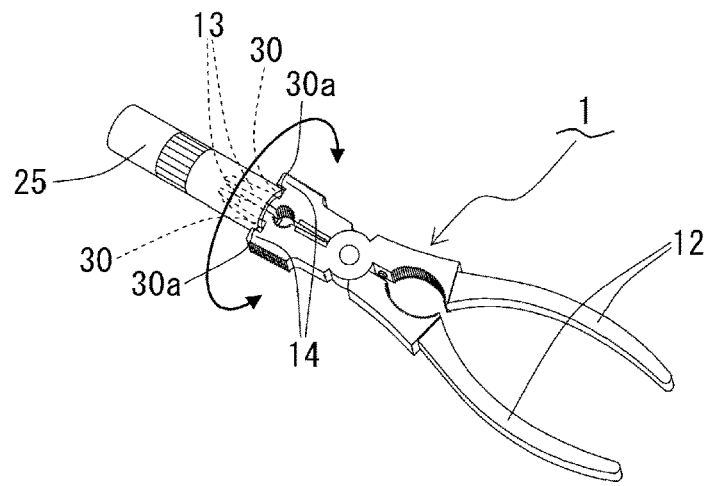
FIG. 11 is a figure explaining a removal method of sputter adhering to the nozzle of the welding-torch using 2nd pinchings of the hand tool.

FIG. 11 shows a removal method of the sputter adhering to the nozzle 25 of the welding-torch 2 using the 2nd pinchings 14 of the hand tool 1. Removal of the sputter adhering to the nozzle 25 using the 2nd pinchings 14 is performed after removing the nozzle 25. When removing the sputter adhered to the nozzle 25 using the 2nd pinchings 14, a user has the nozzle 25 in one hand, and has the grips 12 of the hand tool 1 in another hand. And the user inserts the 1st pinchings 13 into the nozzle 25, and thereby, the end of the nozzle 25 is put in the concave spaces 30, and the user makes the 1st pinchings 13 touch the inner circumferential surface of the nozzle 25, moves the hand tool 1 so as to scratch the inner circumferential surface of the nozzle 25 with the 1st pinchings 13, and the user also makes the 2nd pinchings 14 touch the outer circumferential surface of the nozzle 25, moves the hand tool 1 so as to scratch the outer circumferential surface of the nozzle 25 with the 2nd pinchings 14. Thereby, the sputter adhering to the inner-and-outer circumferential surfaces of the nozzle 25 is scratched off and removed. Moreover, the bottom surfaces 30a or their edges are made to touch the end face of the nozzle 25, and the hand tool 1 is moved so as to scratch the end face of the nozzle 25. Thereby, the sputter adhering to the end face of the nozzle 25 is scratched off and removed.

Figure 12:
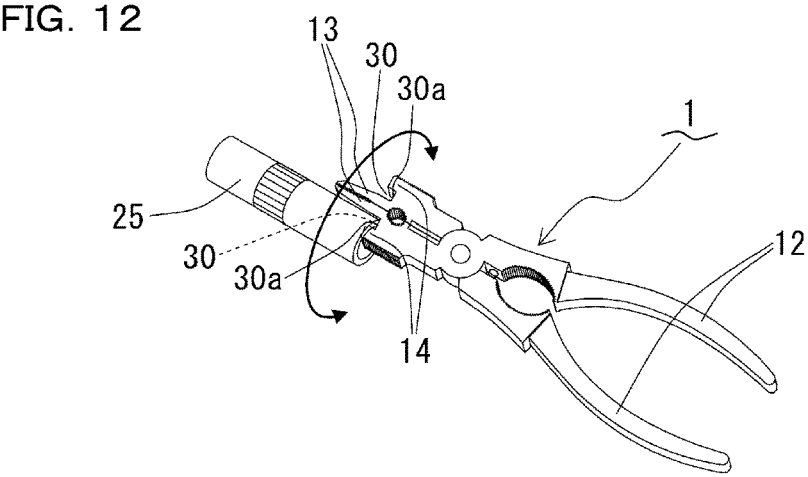
FIG. 12 is a figure explaining another removal method of the sputter adhering to the nozzle of the welding-torch using the 2nd pinchings.

FIG. 12 shows another removal method of the sputter adhering to the nozzle 25 using the 2nd pinchings 14. A user inserts one of the 2nd pinchings 14 into the nozzle 25, and thereby, the end of the nozzle 25 is put in the concave space 30, and the user makes the one of the 2nd pinching 14 touch the inner circumferential surface of the nozzle 25, moves the hand tool 1 so as to scratch the inner circumferential surface of the nozzle 25 with the 2nd pinching 14, and the user also makes one of the 1st pinchings 13 touch the outer circumferential surface of the nozzle 25, moves the hand tool 1 so as to scratch the outer circumferential surface of the nozzle 25 with the one of the 1st pinchings 13. Thereby, the sputter adhering to the inner-and-outer circumferential surfaces of the nozzle 25 is scratched off and removed. Moreover, one of the bottom surface 30a is made to touch the end face of the nozzle 25, and the hand tool 1 is moved so as to scratch the end face of the nozzle 25. Thereby, the sputter adhering to the end face of the nozzle 25 is scratched off and removed.

Figure 13:
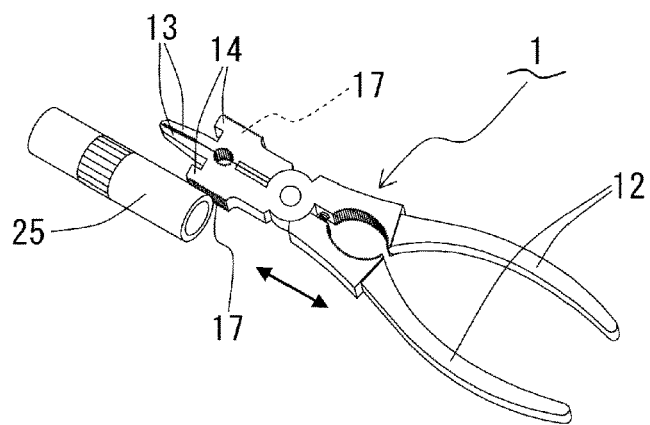
FIG. 13 is a figure explaining a removal method of the sputter adhering to the nozzle of the welding-torch using file-down portions of the hand tool.

FIG. 13 shows a removal method of the sputter adhering to the nozzle 25 using the file-down portions 17 of the hand tool 1. Removal of the sputter adhering to the nozzle 25 using the file-down portions 17 may be performed after removing the nozzle 25, and it may be performed, with the nozzle 25 attached (removed in the example shown). When removing the sputter which adhered to the nozzle 25 using the file-down portions 17, a user makes one of the file-down portions 17 touch the outer circumferential surface or the end face of the nozzle 25 (the outer circumferential surface is touched in the example shown), moves the hand tool 1 so as to scratch the outer circumferential surface or the end face of the nozzle 25 with the one of the file-down portions 17. Thereby, the sputter adhering to the outer circumferential surface or the end face of the nozzle 25 is scratched off and removed.

Figure 14:
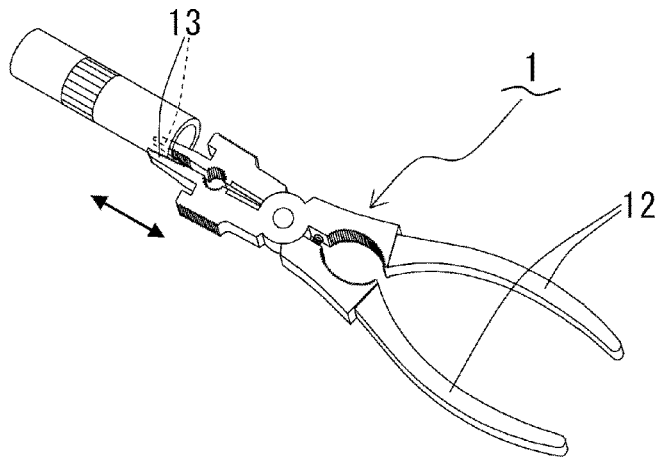
FIG. 14 is a figure explaining a removal method of the sputter adhering to the nozzle of the welding-torch using 1st pinchings of the hand tool.

FIG. 14 shows a removal method of the sputter adhering to the nozzle 25 using the 1st pinchings 13 of the hand tool 1. Removal of the sputter adhering to the nozzle 25 using the 1st pinchings 13 is performed after removing the nozzle 25. When removing the sputter adhering to the nozzle 25 using the 1st pinchings 13, a user pinches the nozzle 25 with the 1st pinchings 13 so that the 1st pinchings 13 may touch both of the inner circumferential surface and the outer circumferential surface of the nozzle 25, and moves the hand tool 1 so as to scratch the inner-and-outer circumferential surfaces of the nozzle 25 with the 1st pinchings 13. Thereby, the sputter adhering to the inner-and-outer circumferential surfaces of the nozzle 25 is scratched off and removed.

According to the hand tool 1 of this embodiment, attaching and detaching of the nozzle 25 and the insulator 24, attaching and detaching of the chip 23, pulling out of the welding-wire 26, and cutting of the welding-wire 26 can be performed using the 4th pinchings 18, the 3rd pinchings 15, the 1st pinchings 13, and the cutter blades 16, respectively. Moreover, removing the sputter adhering to the nozzle 25 is possible using the 2nd pinchings 14. In this case, by inserting the 1st pinchings 13 into the nozzle 25 or inserting one of the 2nd pinchings 14 into the nozzle 25, and thereby, putting the end of the nozzle 25 in the concave space(s) 30 between the 2nd pinching(s) 14 and the 1st pinching(s) 13, and by moving the hand tool 1 so as to scratch the inner-and-outer circumferential surfaces and the end face of the nozzle 25, the sputter adhering to the inner circumferential surface, the outer circumferential surface, and the end face of the nozzle 25 can be removed. Therefore, by such work for putting the end of the nozzle 25 in the concave space(s) 30 between the 2nd pinching(s) 14 and the 1st pinching(s) 13 and moving the hand tool 1, it is possible to remove the sputter adhering to the inner circumferential surface, the outer circumferential surface, and the end face of the nozzle 25. Moreover, by selectively using the 2nd pinchings 14, the file-down portions 17 and the 1st pinchings 13 depending on the shape and thickness of the nozzle 25 and the adhesion condition of sputter, the removal of the sputter can be done with sufficient working efficiency.

Moreover, since the 3rd pinching 15 and the 4th pinching 18 are configured so that the cylindrical spaces 15a, 18a may be formed when the pair of metal stays 10 are closed, they can pinch the nozzle 25, the insulator 24, and the chip 23 of various thickness. Therefore, it is possible to respond to various types of nozzle 25, insulator 24, and welding-torch 2 with different sizes, and high convenience is achieved.

Figure 15:
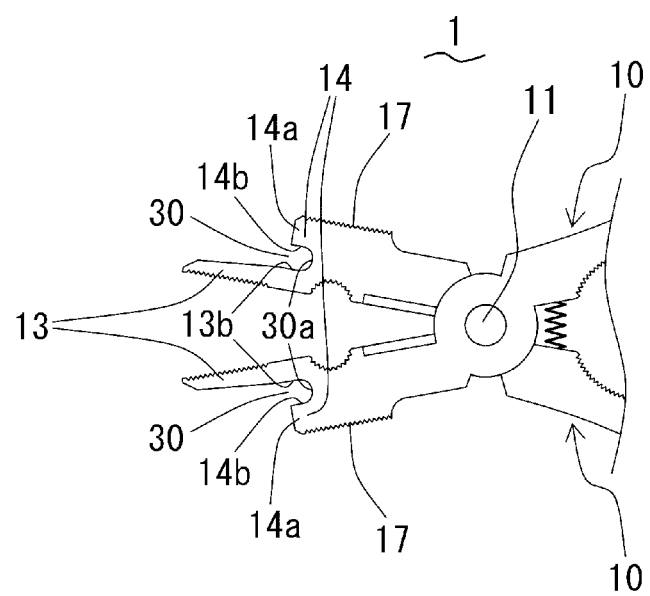
FIG. 15 is a plan view showing a modification of the hand tool in a state where the metal stays are opened.

FIG. 15 shows a modification of the hand tool 1. In this hand tool 1, the bottom surfaces 30a of the concave spaces 30 are semicircle cylindrical curved surfaces along the pivoting axis 11 direction. Other configuration is the same as that of the above-mentioned embodiment. According to such a hand tool 1, it can respond to the nozzle 25 having a roundish end face, for example, and the sputter adhering to such end face of the nozzle 25 can be removed.

In addition, the present invention is not restricted to the configuration of the above-mentioned embodiments, but various modification is possible for it. For example, the positions of the 3rd pinchings 15 and the cutter blades 16 are exchangeable. That is, the 3rd pinchings 15 may be between the pivoting axis 11 and the cutter blades 16, and the cutter blades 16 may be between the 3rd pinchings 15 and the 1st pinchings 13. Moreover, knurled patterns for filing down the sputter adhering to the nozzle 25 may be formed in the facing planes 13b, 14b of the concave spaces 30. Moreover, the file-down portions 17 may be on outer surfaces of the cutter blades 16.

1 Hand tool for welding-torch maintenance (Hand tool)
10 Metal stay
11 Pivoting axis
12 Grip
13 1st pinching
13a Plane
13b Back of 1st pinching (Facing plane)
14 2nd pinching
14a Projection
14b Inside plane of projection (Facing plane)
15 3rd pinching
15a Flat cylindrical space
15b Curved surface
16 Cutter blade
17 File-down portion for grinding
18 4th pinching
18a Cylindrical space
18b Curved surface
19 Spring
2 Welding-torch
21 Torch body
22 Chip body
23 Chip
24 Insulator
25 Nozzle
26 Welding-wire
30 Concave space
30a Bottom surface of concave space

The invention claimed is:

1. A hand tool for welding-torch maintenance having a pair of metal stays crossing at a pivoting axis and turnably supported by the axis, wherein the pair of metal stays comprises:
grips located at a proximal end of the stays, which are handled by a user for turning the metal stays,
jaws located at a distal end of the metal stays, which are used for pinching a welding-wire when the welding-wire is pulled out, and
scrapers located at a proximal end of the jaws and extending laterally outward therefrom, the scrappers having projections extending longitudinally parallel to, and toward the distal end of, the jaws, such that the scrappers form indented spaces having mutually facing parallel planes configured by an inside plane of the projections and an outside plane of the jaws, wherein the scrapers are configured to pinch a nozzle of the welding-torch and touch inner-and-outer circumferential surfaces of the nozzle to remove sputter adhering to the surfaces,
wherein the jaws are configured to be inserted into the nozzle when the metal stays are closed by turning,
wherein the mutually facing parallel planes of the indented spaces are parallel to and touch the inner-and-outer circumferential surfaces of the nozzle when the jaws are inserted into the nozzle, and
wherein an outside plane of the projections have roughened surfaces for grinding.

2. The hand tool according to claim 1, wherein the hand tool further comprises:
first pinching surfaces located between the jaws and the pivoting axis, which are used for pinching a chip for pulling out a welding-wire of the welding-torch so as to attach or detach the chip,
cutter blades located between the jaws and the pivoting axis, which are used for cutting the welding-wire.

3. The hand tool according to claim 2, wherein the hand tool further comprises:
second pinching surfaces located between the pivoting axis and the grips for pinching the nozzle of the welding-torch so as to attach or detach the nozzle, and
the first pinching surfaces and the second pinching surfaces are configured so as to form cylindrical spaces, respectively, in view from the pivoting axis direction when the metal stays are closed by turning.

\* \* \* \* \*